(12) United States Patent
MacArthur

(10) Patent No.: US 6,291,391 B1
(45) Date of Patent: Sep. 18, 2001

(54) METHOD FOR PRESULFIDING AND PRECONDITIONING OF RESIDUUM HYDROCONVERSION CATALYST

(75) Inventor: James B. MacArthur, Denville, NJ (US)

(73) Assignee: IFP North America, Inc., Princeton, NJ (US)

(*) Notice: Subject to any disclaimer, the term of this patent is extended or adjusted under 35 U.S.C. 154(b) by 0 days.

(21) Appl. No.: 09/190,314

(22) Filed: Nov. 12, 1998

(51) Int. Cl.[7] .............................. B01J 20/34; B01J 38/04; B01J 27/047; B01J 27/049; B01J 27/051

(52) U.S. Cl. .............................. 502/216; 502/20; 502/34; 502/219; 502/220; 502/221; 502/313; 502/315; 502/321; 502/327

(58) Field of Search .............................. 502/20, 34, 219, 502/220, 221, 313, 315, 321, 337, 216

(56) References Cited

U.S. PATENT DOCUMENTS

| 4,013,545 | * | 3/1977 | Hilfman | 208/111 |
|---|---|---|---|---|
| 4,089,930 | | 5/1978 | Kittrell et al. | 423/239 |
| 4,176,087 | * | 11/1979 | Dew et al. | 502/244 |
| 4,177,136 | | 12/1979 | Herrington et al. | 208/215 |
| 4,454,026 | * | 6/1984 | Hensley, Jr. et al. | 208/251 H |
| 4,495,060 | | 1/1985 | Abrams | 208/480 |
| 4,530,917 | | 7/1985 | Berrebi | 502/220 |
| 4,744,887 | | 5/1988 | Van Driesen et al. | 208/152 |
| 4,943,547 | | 7/1990 | Seamans et al. | 502/150 |
| 4,970,190 | * | 11/1990 | Lopez et al. | 502/220 |
| 5,041,404 | | 8/1991 | Seamans et al. | 502/150 |
| 5,215,954 | | 6/1993 | Seamans et al. | 502/219 |
| 5,292,702 | | 3/1994 | Seamans et al. | 502/219 |
| 5,525,211 | * | 6/1996 | Sudhakar et al. | 208/217 |
| 5,688,736 | | 11/1997 | Seamans et al. | 502/219 |
| 5,821,191 | * | 10/1998 | Lockemeyer | 502/216 |

OTHER PUBLICATIONS

H. Hallie, Presulfiding of Hydrotreating Catalysts, Oil & Gas Journal, *Dec. 20, 1982* pp 69–74.

* cited by examiner

*Primary Examiner*—Mark L. Bell
*Assistant Examiner*—Patricia L. Hailey
(74) *Attorney, Agent, or Firm*—John F. Ritter

(57) ABSTRACT

An improved method is described for presulfiding and preconditioning a residuum hydrotreating or hydrocracking catalyst as an integrated part of the hydroconversion process in which catalyst is added on-stream intermittently or continuously without interruption of the hydroconversion process. The method is used to condition, activate, or presulfide fresh or regenerated catalyst prior to its addition to the hydroconversion reactor utilizing product streams from the hydroconversion process.

13 Claims, 3 Drawing Sheets

CATALYST PRECONDITIONING SYSTEM

FIG. 1 RESID HYDROCONVERSION PROCESS

METHOD FOR PRESULFIDING AND PRECONDITIONING OF RESIDUUM HYDROCONVERSION CATALYST

FIELD OF INVENTION

This invention relates to an improved method of presulfiding a supported metal oxide catalyst for use in hydrotreating and/or hydrocracking hydrocarbon feedstocks, the presulfurized catalytic composition resulting therefrom, and a hydrotreating and/or hydrocracking process utilizing such presulfurized metal oxide catalyst. This invention further relates to an improved method for integrating catalyst presulfiding with a residuum hydroconversion process.

BACKGROUND OF THE INVENTION

A hydrotreating catalyst may be defined as any catalyst composition which may be used to catalyze the hydrogenation of hydrocarbon feedstocks to increase its hydrogen content and/or remove heteroatom contaminants. A hydrocracking catalyst may be defined as any catalyst composition which may be used to catalyze the addition of hydrogen to large or complex hydrocarbon molecules as well as the cracking of the molecules to obtain smaller, lower molecular weight molecules. A residuum hydroconversion process may be defined as a process for converting petroleum atmospheric or vacuum residue at conditions of elevated temperatures and pressures in the presence of hydrogen and a hydrotreating and/or hydrocracking catalyst to convert the feedstock to lower molecular weight products with reduced contaminant (such as sulfur and nitrogen) levels.

Catalyst compositions for use in the residuum hydroconversion process are well known to those skilled in the art and several are commercially available. Suitable catalysts include catalysts containing nickel, cobalt, tungsten, molybdenum and combinations thereof supported on a porous substrate such as silica, alumina, titania, or combinations thereof.

For maximum effectiveness these metal oxide catalysts are converted at least in part to metal sulfides. The metal oxide catalysts can be sulfided in the reactor by contact at elevated temperatures with hydrogen sulfide or a sulfur-containing oil or feedstock.

The catalysts may also be provided to the end-user already having sulfur incorporated therein. However, these ex-situ methods of presulfurizing supported metal oxide catalysts have suffered from excessive stripping of sulfur upon start-up of a hydrotreating reactor in the presence of a hydrocarbon feedstock. As a result of sulfur stripping, a decrease in catalyst activity is observed. It is therefore well known in the art that the activity and activity maintenance of the above mentioned metal oxide catalysts is substantially enhanced by presulfiding of the catalysts in the manufacturing process or in-situ during startup of the hydroconversion process.

Hydroconversion processes can operate in a fixed catalyst bed mode in which a batch of catalyst is utilized in the hydroconversion reactors for periods of typically three months to twenty-four months before the process is shut down to remove and replace the catalyst. In this fixed-bed mode, catalyst can be presulfided during unit startup to achieve maximum levels of catalytic performance (hydrogenation, desulfurization, denitrogenation, conversion, etc.)

In hydrotreating/hydrocracking processes, which add and withdraw catalyst on a regular basis (i.e. daily, weekly) while the process operates at normal conditions of temperature and pressure, catalyst is typically added in an as-manufactured state (i.e. containing metal oxides). Processes which operate in this mode include ebullated-bed hydrocrackers (such as H-Oil™ Process), moving-bed hydrotreater, Onstream Catalyst Replacement reactors (OCR) and guard reactors used in fixed-bed resid hydrotreaters.

In ebullated-bed processing applications, which utilize first generation low activity catalysts, minimal advantage has been identified for presulfiding the catalysts to be added on a daily basis. These catalysts achieve some presulfiding upon addition to the hydroconversion reactor. However, such operations that utilize new second and third generation catalysts (high desulfurization, low sediment), a significant increase in desulfurization, denitrogenation, and Conradson carbon removal can be achieved by presulfiding the catalyst additions.

The benefits of catalyst presulfiding in general are well known in the prior art. For example, the use of high boiling oils, such as vacuum gas oils, and hydrocarbon solvents to aid the incorporation of sulfur into a catalyst is taught in U.S. Pat. No. 4,943,547, issued Jul. 24, 1990. Further, U.S. Pat. No. 4,530,917, issued Jul. 23, 1985, to Berrebi discloses a method of presulfurizing a hydrotreating catalyst with organic polysulfides.

U.S. Pat. No. 4,117,136, issued Dec. 4, 1979, to Herrington et al discloses a method of catalyst presulfurizing wherein a catalyst is treated with elemental sulfur. Hydrogen is then used as a reducing agent to convert the elemental sulfur to hydrogen sulfide in situ. U.S. Pat. No. 4,089,930, issued May 16, 1978, to Kittrell et al discloses the pretreatment of a catalyst with elemental sulfur in the presence of hydrogen. All of the aforementioned patents are hereby incorporated by reference into this application.

This invention describes an improved method for achieving the catalyst presulfiding and preconditioning during normal plant operations but prior to addition of the catalyst to the catalytic reactor and can be accomplished in most situations with minimal equipment changes. This provides the benefit of being able to retrofit existing units as well as implementing on grass roots applications. Moreover, the invention allows for the preconditioning of the residuum hydrotreating or hydrocracking catalyst without interrupting the continuous operation of the resid hydroconversion process. Importantly, the resid hydroconversion process of this invention can operate continuously for several years while maintaining high catalyst activity.

SUMMARY OF THE INVENTION

It is an object of the present invention to presulfurize a hydrotreating and/or hydrocracking catalyst in a manner which maximizes the activity of the catalyst when added to the hydrotreating and/or hydrocracking reactor.

It is yet a further object of the present invention to prepare a safe, stable, presulfided hydrotreating and/or hydrocracking catalyst, either fresh or regenerated.

It is yet a further object of the present invention to provide a presulfided hydrotreating and/or hydrocracking catalyst that upon activation in-situ provides a highly active hydrotreating and/or hydrocracking catalyst.

It is yet another object of the present invention to provide a presulfided hydrotreating and/or hydrocracking catalyst that can be brought to severe hydrocracking conditions rapidly without rapid loss of activity.

It is another object of the invention to precondition the residuum hydrotreating or hydrocracking catalyst without interrupting the continuous operation of the resid hydroconversion process.

This invention describes an improved method for presulfiding and preconditioning a residuum hydrotreating or hydrocracking catalyst as an integrated part of the hydroconversion process. Moreover, the method allows for catalyst to be added onstream intermittently or continuously without interruption of the hydroconversion process. The method is used to condition, activate, or presulfide fresh or regenerated catalyst prior to its addition to the hydroconversion reactor utilizing product streams from the hydroconversion process.

Particularly, this invention describes a method to improve the activity and activity maintenance of a hydrotreating and/or hydrocracking catalyst utilized in a resid hydroconversion process comprising:

(a) exposing a metal oxide catalyst to $H_2S$ and $H_2$ rich streams within the hydroconversion process to at least partially convert the said metal oxide catalyst to a metal sulfide; and (b) conditioning said catalyst by passing it through a liquid hydrocarbon stream; wherein the above steps are performed without interrupting the continuous operation of the resid hydroconversion process.

More specifically, this invention describes a method to improve the activity and activity maintenance of a hydrotreating and/or hydrocracking catalyst utilized in a resid hydroconversion process which comprises:

(a) presulfiding the metal oxide catalyst by exposing said catalysts to $H_2S$ and $H_2$ rich streams within the hydroconversion process at temperatures between about 300° F. and 750° F., at pressures from atmospheric to 3,000 PSIG, and sufficient quantities of $H_2S$ to increase the sulfur content of the treated catalyst to 5 to 15 weight percent sulfur;

(b) preconditioning the presulfided catalyst by passing a liquid hydrocarbon stream, such as an atmospheric or vacuum gas oil and an $H_2S$ and $H_2$ rich stream across the catalyst at temperatures of about 500 to 750° F. and pressures of atmospheric to reactor pressure of 3,000 PSIG for 15 minutes to 10 hours in order to deposit a low level of carbon (1 to 5 wt %) on the catalyst; wherein the above steps are carried out without interrupting the continuous operation of the resid hydroconversion process.

DETAILED DESCRIPTION OF INVENTION

Figure 2:
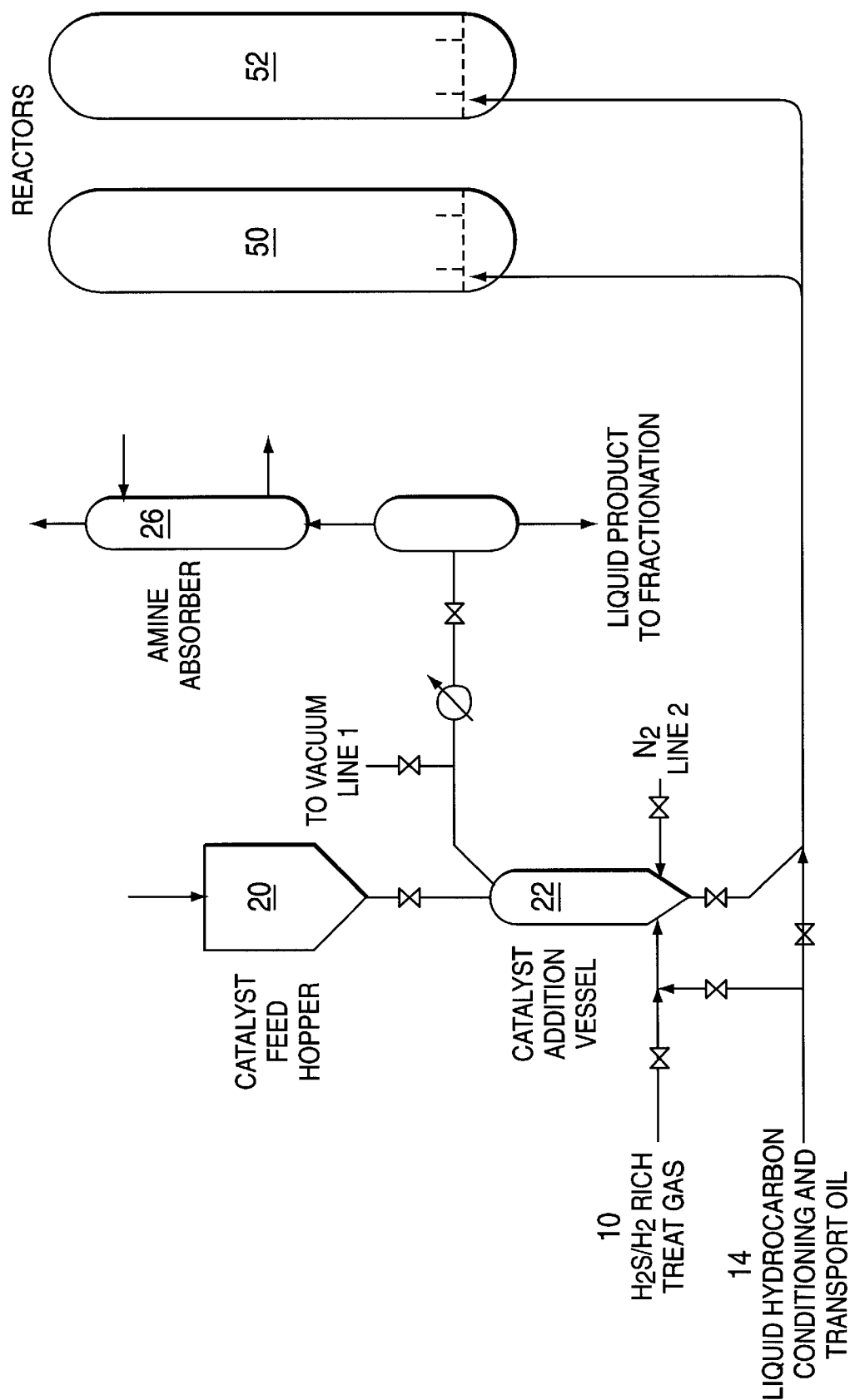
FIG. 2 is a schematic flowsheet of the catalyst preconditioning system.

FIG. 2 is a schematic flowsheet of the catalyst preconditioning system. Fresh or regenerated catalyst used for this process is added to a catalyst addition vessel 22 from the catalyst feed hopper 20 in the as-received metal oxide state. Suitable catalysts for the resid hydroconversion process include catalysts containing nickel, cobalt, tungsten, molybdenum and combinations thereof supported on a porous substrate such as silica, alumina, titania, or combinations thereof. The catalyst addition vessel 22 is subsequently evacuated and/or purged with nitrogen to remove oxygen and moisture from the vessel.

Figure 1:
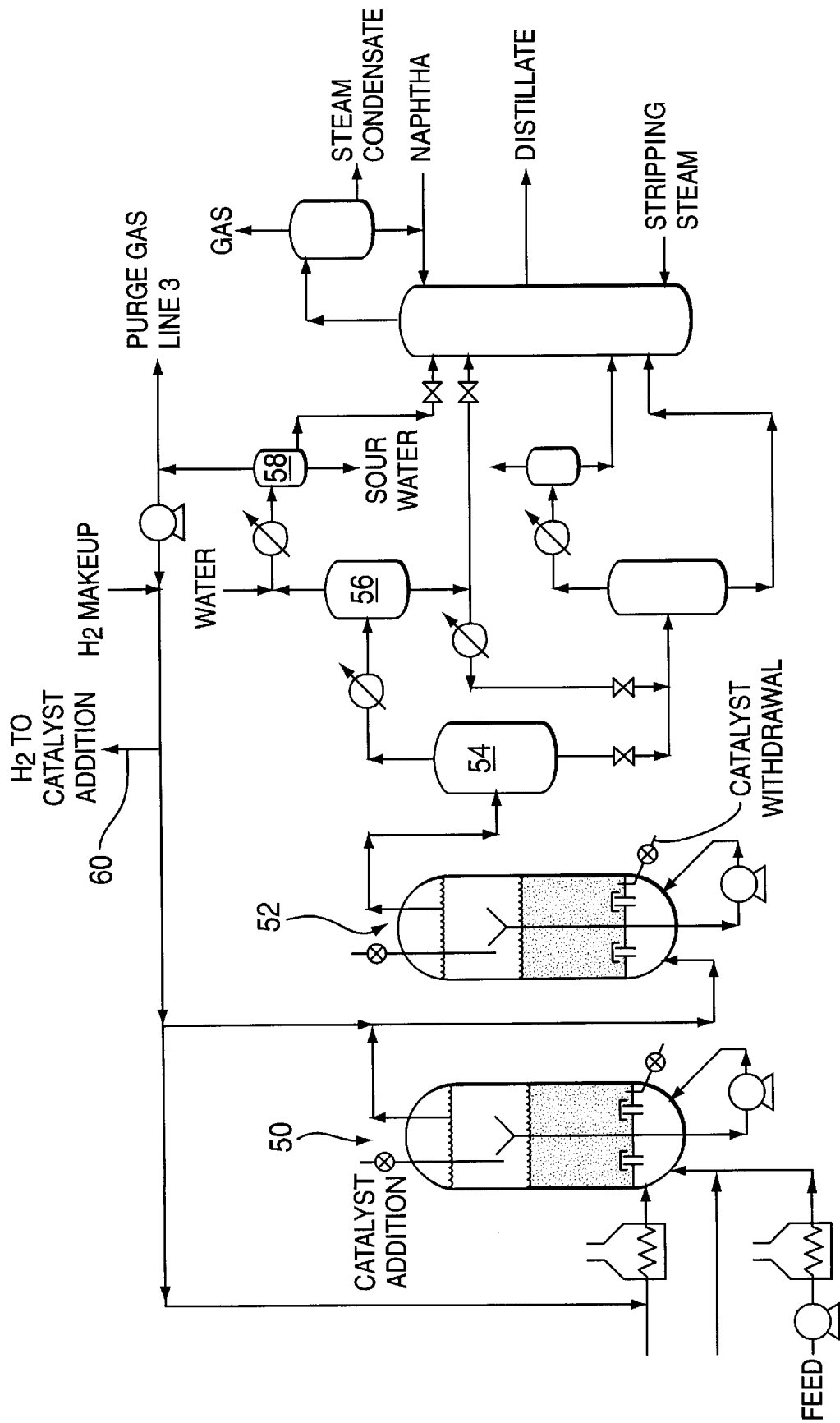
FIG. 1 shows a schematic flowsheet of a resid hydroconversion process.

The catalyst addition vessel 22 containing the fresh catalyst is then pressurized to the pressure of the downstream intermediate pressure amine absorber 26 with a gas containing hydrogen and hydrogen sulfide to presulfide the catalyst. This $H_2S$ rich hydrogen stream 10 can come from a number of available sources within the resid hydroconversion process flow scheme including: (i) a high pressure cold separator 58, (ii) a warm high pressure separator 56, or (iii) any $H_2$ and $H_2S$ rich streams being recovered in the process. These sources are shown in FIG. 1. The $H_2/H_2S$ rich stream 10 is typically available at pressures of 400 to 3,000 PSIG, and at temperatures from 100 to 800° F.

Catalyst presulfiding is preferably carried out at temperatures from about 300 to 750° F. with pressure increasing from atmospheric to approaching that of the available stream (i.e. 400–3,000 PSIG). Additionally, $H_2S$ concentrations in the feed gas of 1 to 10 volume percent are preferred. Moreover, it is desirable to treat the catalyst with a quantity of $H_2S$ at least 50% greater than that required to convert the metal oxide to the metal sulfide state to assure complete presulfiding.

Using typically available commercial hydroconversion catalysts such as Grace GR-25, Criterion HDS-2443B, or AKZ0 Nobel KF-1303, approximately 8 to 15 weight percent sulfur (in the form of $H_2S$ or sulfur in the liquid streams) is required to completely sulfide the catalyst. Flow is then initiated through the catalyst to be added to the hydrocracking reactor, through a cooler and vapor/liquid separator to the amine absorber 26 for $H_2S$ removal and then to hydrogen recovery.

The catalyst is subsequently exposed to a stream of hydrocarbons to further enhance the catalyst activity and activity maintenance. Distillate hydrocarbon stream 14, supplied from the warm high pressure separator 56 or by using an atmospheric and/or vacuum gas oil, is circulated across the catalyst, along with the $H_2$, and $H_2S$ rich stream 10, in the catalyst addition vessel 22. The temperature of the hydrocarbon stream is typically 500 to 750° F. with pressures from atmospheric to that of the available stream (400–3,000 PSIG).

This step completes the presulfiding and preconditioning process of this invention. At this point, a moderately low level of carbon (typically 1–5 weight percent) has been deposited on the catalyst. This coke layer protects the catalyst from surface temperature exotherms when the catalyst is initially added to the high severity (typically 750 to 850° F.) resid hydrocracking reactor environment.

Once the catalyst is presulfided and preconditioned in the above manner, it is ready for addition to the resid hydroconversion process. The catalyst addition vessel 22 is filled with liquid hydrocarbon from stream 14 and pressurized to reactor pressure with hydrogen. The catalyst is then transported to one of the reactors 50 or 52 with the liquid hydrocarbon and added to said reactor(s) for resid hydrocarbon processing. Reactors 50 and 52 are shown both in FIG. 2 and in FIG. 1, a schematic of the overall resid hydroconversion process.

Figure 3:
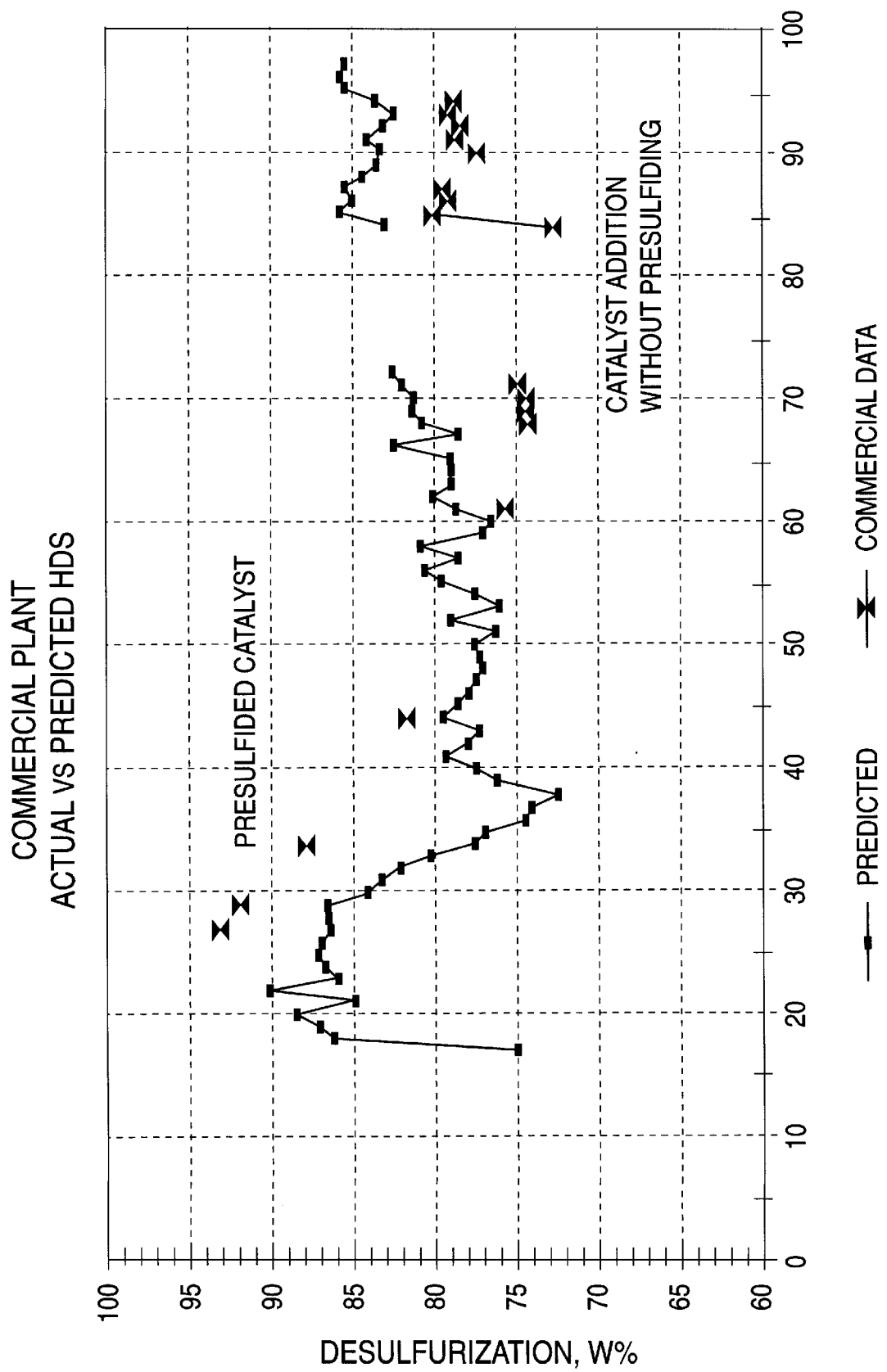
FIG. 3 is a graph of desulfurization versus time showing the effect of catalyst presulfiding.

The positive effect of presulfiding resid hydroconversion catalyst can be seen in FIG. 3. This figure shows commercial resid hydroconversion plant data operating initially with 100 percent presulfided catalyst with no on-stream catalyst addition or withdrawal. Initial actual catalyst desulfurization performance is superior to that predicted from correlations based on small scale testing. It is important to note that the model prediction is based on 100 percent presulfided catalyst. Desulfurization performance declined as catalyst was aged by feeding vacuum resid feedstock. The model prediction is 4–5 w % HDS less than the actual data but follows the decreasing trend of HDS. After day 40, on-stream catalyst addition (with unpresulfided catalyst) and withdrawal were practiced on a regular basis. The desulfurization activity, however, was not restored to that predicted from correlations since the catalyst was not presulfided. Application of this invention is expected to restore the catalyst desulfurization activity to expected levels.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be described by the following examples which are provided for illustrative purposes and are not to be construed as limiting the invention.

EXAMPLE 1

In the resid hydroconversion process similar to that shown in FIG. 1, fresh or regenerated nickel-molybdenum catalyst at ambient temperature and pressure is fed via lock hopper to a catalyst addition vessel similar to that shown in FIG. 2. The vessel is then evacuated of air and moisture using one line and purged with nitrogen using another line. The catalyst in the catalyst addition vessel is then presulfided by feeding a $H_2S$ rich hydrogen purge gas from a high pressure cold separator. In this example, the stream is available at 130° F. and 2,760 PSIA and contains 2.2 volume % $H_2S$, 75 volume % $H_2$, with the remainder mostly light hydrocarbons. The catalyst is a nickel-molybdenum on alumina extrudate, and designated as Criterion HDS-2443B catalyst.

Flow is initiated with the treat gas at 130° F. and atmospheric pressure while the stream is heated to the desired presulfiding temperature of between about 300 to 750° F. The catalyst addition vessel is slowly pressurized to the pressure of the downstream intermediate pressure amine absorber. Flow is then initiated to the amine absorber for $H_2S$ removal and then to hydrogen recovery. Flow of the $H_2S$ and $H_2$ rich treat gas is continued until approximately 12 lbs. of sulfur are passed through the catalyst bed per 100 lbs. of fresh nickel-molybdenum catalyst to achieve complete catalyst presulfiding. Flow is then discontinued.

Heavy petroleum transport oil is then allowed to fill the catalyst addition vessel with oil, circulate the oil through the catalyst, and heat the catalyst to the range of 500 to 650° F. for transfer to the hydroconversion reactor. The catalyst addition vessel is then pressurized to reactor conditions with hydrogen from the hydroconversion process and the catalyst is transported to the hydroconversion reactor. This procedure can typically be carried out within 12 hours. During this time, the resid hydroconversion process operates in a continuous manner at temperature and pressure producing the desired product yields and qualities.

EXAMPLE 2

In the resid hydroconversion process similar to that shown in FIG. 1, fresh or regenerated nickel-molybdenum catalyst at ambient temperature and pressure is fed via lock hopper to a catalyst addition vessel as similar to that shown in FIG. 2. The vessel is then evacuated of air and moisture using one line, and purged with nitrogen using a different line.

The catalyst in the catalyst addition vessel is then presulfided by feeding a portion of the $H_2S$ rich vapor stream leaving the warm high pressure separator (which is illustrated in the FIG. 1 schematic as No. 56). The stream is at approximately 525° F. and 2,800 PSIA, and contains 3 volume % $H_2S$ and 75 volume % $H_2$, with the remainder mostly light hydrocarbons. The catalyst is a nickel-molybdenum on alumina extrudate having the designation as Grace GR-25 catalyst. Flow is initiated to the catalyst addition vessel to pressurize this vessel to the pressure of the downstream intermediate pressure amine absorber.

Flow is then established through the catalyst addition vessel to the intermediate pressure amine absorber for $H_2S$ removal and then to hydrogen recovery. The catalyst is gradually heated up and presulfided at a temperature of 525° F. and a pressure of approximately 400 PSIG with the high pressure $H_2S$ containing vapor stream. Treatment is continued until approximately 12 lbs. of sulfur are passed through the catalyst bed per 100 lbs. of fresh nickel-molybdenum catalyst to achieve complete catalyst presulfiding. At these conditions, approximately 8 lbs. of sulfur will be retained on the catalyst.

Next, a portion of the liquid stream from the warm high pressure separator is blended with the vapor stream used for presulfiding (as described above). The combined stream is subsequently fed across the catalyst for between 15 minutes to 10 hours to condition the catalyst. The catalyst will contain about 1 to 5 weight percent carbon after exposure to the combined stream.

Flow is then terminated to the downstream equipment, and the catalyst addition vessel is filled with liquid hydrocarbons and pressurized with hydrogen to near reactor pressure using hydrogen from the hydroconversion process (illustrated in FIG. 1 as No. 60). The catalyst is then transported to the hydroconversion reactor using available liquid hydrocarbons from the high pressure warm separator.

The invention described herein has been disclosed in terms of specific embodiments and applications. However, these details are not meant to be limiting and other embodiments, in light of this teaching, would be obvious to persons skilled in the art. Accordingly, it is to be understood that the drawings and descriptions are illustrative of the principle of the invention, and sholuld not be construed to limit the scope thereof.

I claim:

1. A method to improve the activity and activity maintenance of a hydrotreating and or hydrocracking catalyst utilized in a resid hydroconversion process comprising:
   (a) exposing a metal oxide catalyst to $H_2S$ and H2 rich streams in an off-line vessel prior to adding said metal oxide catalst to the on-line hydroconversion reactor, said $H_2S$ and H2 rich streams supplied from sources available within the hydroconversion process to at least partially convert the said metal oxide catalyst to a metal sulfide; and
   (b) conditioning said catalyst by passing it through a liquid hydrocarbon stream, said liquid hydrocarbon stream supIlied from sources available within the hydroconversion process;
wherein the above steps are performed without interrupting the continuous operation of the resid hydroconversion process.

2. The method in claim 1 where the process is a fixed-bed resid hydrotreating process having guard beds which are periodically taken on-stream and off-stream to remove metal contaminants in the resid feedstocks.

3. The method in claim 1 where the process is a moving bed resid hydroconversion process or utilized on-stream catalyst replacement (OCR).

4. The method in claim 1 where the feedstock is a petroleum vacuum gas oil, deasphalted oil, heavy coker gas oil, FCC slurry oil, or coal-derived gas oil.

5. The method in claim 1 where the process is an ebullated-bed hydroconversion process having 1, 2, or 3 reactor stages.

6. The method in claim 1 where the catalyst is presulfided such that 2 to 10 weight percent sulfur is deposited on the catalyst.

7. The method of claim 1 wherein the liquid hydrocarbon stream from the conditioning step (b) is selected from the group consisting of atmospheric gas oil and vacuum gas oil.

8. The method of claim 7 wherein the vapor stream for the presulfiding step (a) is an $H_2S$ and $H_2$ rich stream containing between 60–90% $H_2$ and 1–5% $H_2S$.

9. The method of claim 1 wherein the conditioning step (b) results in a deposition of between 1–10 weight percent coke on the catalyst.

10. The method of claim 1 wherein the conditioning step (b) results in a deposition of between 1–5 weight percent coke on the catalyst.

11. The method of claim 1 wherein conditioning step (b) is performed at temperatures at about between 400–800° F.

12. The method of claim 11 wherein conditioning step (b) is performed at pressures of atmospheric to reactor pressure of 3,000 PSIG for 15 minutes to 10 hours.

13. The method of claim 1 wherein conditioning step (b) is performed at pressures of atmospheric to reactor pressure of 3,000 PSIG.

* * * * *